(12) United States Patent
Peyre

(10) Patent No.: US 6,474,194 B1
(45) Date of Patent: Nov. 5, 2002

(54) AUTOMATIC PEDAL FOR ALL-TERRAIN BICYCLE

(75) Inventor: Henri Peyre, Nevers (FR)

(73) Assignee: Look Cycle International, Nevers (FR)

( * ) Notice: Subject to any disclaimer, the term of this patent is extended or adjusted under 35 U.S.C. 154(b) by 0 days.

(21) Appl. No.: 09/616,946

(22) Filed: Jul. 14, 2000

(30) Foreign Application Priority Data

Jul. 15, 1999 (FR) .............................................. 9909146

(51) Int. Cl.⁷ ................................................. G05G 1/16
(52) U.S. Cl. ..................................................... 74/594.6
(58) Field of Search ............................. 74/594.4, 594.6

(56) References Cited

U.S. PATENT DOCUMENTS

| | | | | |
|---|---|---|---|---|
| 4,840,086 A | * | 6/1989 | Bidal | 74/594.6 |
| 5,007,185 A | * | 4/1991 | Lazarski | 74/594.6 |
| 5,105,683 A | * | 4/1992 | Mercat et al. | 74/594.6 |
| 5,381,708 A | | 1/1995 | Liao | 74/594.6 |
| 6,341,540 B2 | * | 1/2002 | Steinberg | 74/594.6 |

FOREIGN PATENT DOCUMENTS

| | | |
|---|---|---|
| EP | 0 780 289 | 6/1997 |
| EP | 0 826 589 | 3/1998 |
| FR | 1.030.485 | 6/1953 |
| FR | 2 612 869 | 9/1988 |
| FR | 2 746 761 | 10/1997 |
| GB | 2 202 499 | 9/1988 |

\* cited by examiner

Primary Examiner—David A. Bucci
Assistant Examiner—Chong H. Kim
(74) Attorney, Agent, or Firm—Young & Thompson

(57) ABSTRACT

A cycle pedal includes a pedal body (1) provided with a front fixed member (3) for engagement with a hooking element fixed below the sole of a bicyclist's shoe, and with a rear movable member (4) for retaining the hooking element. The rear retaining member (4) includes a resilient element (7) fixed to receive the pedal body (1) and operating bendingly between a bent position for freeing the hooking member and a position for retaining the latter against a retaining plane (6, 7) on the body of the pedal (1).

4 Claims, 2 Drawing Sheets

US 6,474,194 B1

AUTOMATIC PEDAL FOR ALL-TERRAIN BICYCLE

BACKGROUND OF THE INVENTION

The invention relates to an automatic pedal for a bicycle, in particular for an all-terrain bicycle (ATB), but which could also be used on a touring bicycle.

This automatic pedal is, but not exclusively, a pedal with double retention surface of the type described in French patent application FR 99 00722 of the applicant.

The pedal comprises a pedal body provided with a transverse recess for the securement to the body an axle connected to a pedal crank of the bicycle. This axle is conventionally mounted in a bearing disposed in the pedal body and permits rotation of the pedal about the axle during pedaling.

The pedal body is provided with a front engagement member, a hooking element for a plate fixed below the sole of a bicycle shoe, and with a rear movable retaining member for this plate. This rear member is pre-stressed by resilient means which usually is constituted by at least one spring which can be of the coil compression type, torsion type, tension type or blade type. The pedal often comprises moreover a cam or screw device permitting adjustment of the tension of the resilient means.

In a pedal of this type, the assembly constituted by the rear movable retaining member, the resilient member urging this member toward its retaining position, and the device for adjusting the tension of the spring, comprises in effect a relatively high number of elements, which requires substantial time during assembly on the body of the pedal. Moreover, it is also necessary to provide recesses within the pedal body to receive all these elements, which complicates production.

SUMMARY OF THE INVENTION

The object of the invention is to provide an automatic pedal that is extremely simple and less difficult to produce because it comprises a minimum number of elements, in particular as to the rear movable member. As a result, the assembly of the pedal is simplified and the cost of the pedal is greatly reduced.

Another object of the invention is to provide a device for the rapid and simple adjustment of the hardness of the resilient return means for the movable rear member.

The invention has for its object an automatic bicycle pedal of the type comprising a pedal body provided with a front fixed member for engagement with a hooking member fixed below the sole of the shoe of the bicyclist, and the rear movable retaining member for said hooking member, characterized in that the rear retaining member comprises a resilient member fixed in containing relationship on the pedal body and operating bendingly between a bent position for freeing the hooking member and a retaining member of this latter against a retaining surface on the pedal body.

According to other characteristics of the invention:

- the resilient member comprises a blade operating by bending along its width;
- the blade is clamped against the pedal body with the help of a plate disposed outside the blade and which defines the line of bending of the blade;
- the plate comprises a recess opening at the upper end of the plate and defining a bending space for the blade between the body of the pedal and the plate, the upper edge of the recess limiting the bending of the blade, whilst its lower edge defines said bending line;
- the plate is adjustable in height so as to displace the line of bending of the blade to adjust the hardness of the blade by modifying the length of the lever arm of the latter;
- the plate is, so as to permit its height adjustment, provided with an oblong opening through which passes a securement screw of the blade onto the pedal body, by gripping the blade between the pedal body and the plate;
- the resilient element is overall of C shape and constitutes simultaneously a front fixed member for engagement with the retaining element on a pedal with a double retention plane;
- the plate and the pedal body comprise indexing means indicating an increase or decrease of the hardness of the blade;
- the blade comprises in its median portion a U-shaped cutout which delimits a tongue in which is provided a securement hole for the blade such that the length of the lever arm of the portion of the blade subjected to deformation will be increased;
- the blade comprises in its median portion an elongated slot, such that the blade deforms uniformly, in this portion it is flattened and beveled;
- the blade comprises in its median portion a triangular opening, the lower part of the blade adjacent the hole 11 for passage of the screw being more stressed than the upper portion;
- the blade comprises in its median portion two opposite and symmetrical cutouts which narrow the blade upwardly;
- the blade in its median portion comprises two opposite and symmetrical cutouts which extend parallel to each other;

BRIEF DESCRIPTION OF THE DRAWINGS

The invention will now be described in greater detail with the help of a non-limiting example of several embodiments of the pedal according to the invention with reference to the accompanying drawings, in which.

DESCRIPTION OF THE PREFERRED EMBODIMENTS

Figure 1:
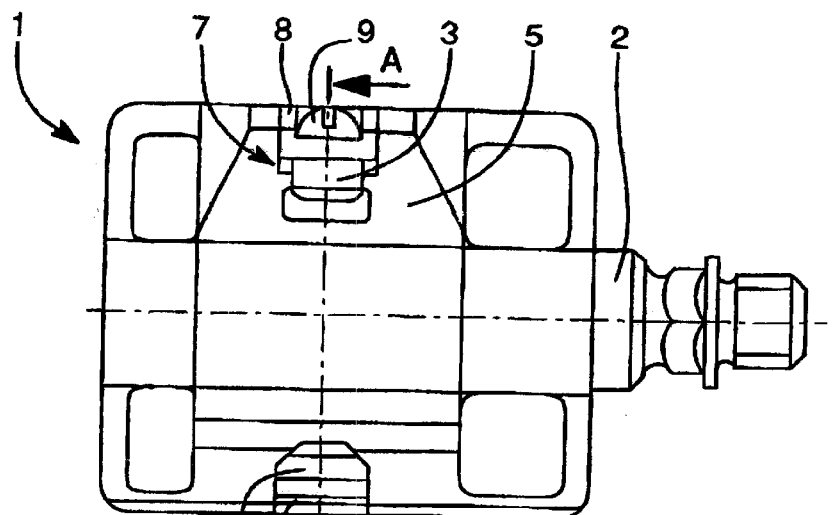
FIG. 1 is a top plan view of a pedal according to the invention.
Figure 2:
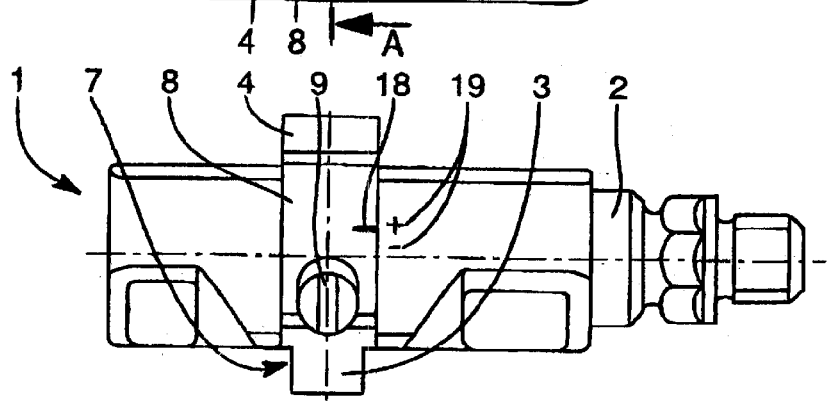
FIG. 2 is a rear view of the pedal of FIG. 1, showing the adjustment means for the hardness in a high hardness position.
Figure 3:
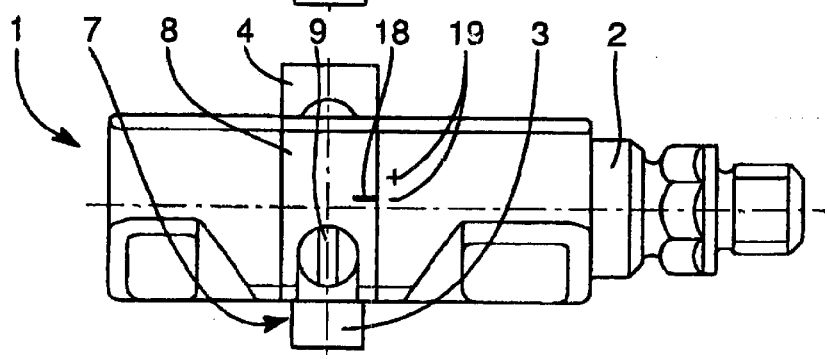
FIG. 3 is a rear view of the pedal of FIG. 1, showing the adjustment means of the hardness in a reduced hardness position.

FIGS. 1 to 4 show a pedal according to the invention which comprises a pedal body 1, preferably of plastic material, in which a pedal axle 2 is disposed in bearings (not shown) so as to permit the rotation of the pedal during pedaling. The pedal axle 2 is connected by screwing to a pedal crank (not shown).

The pedal body 1 is provided with a front fixed member 3 for engagement with a hooking member in the form of a plate fixed below the sole of a bicyclist's shoe (not shown) and a rear movable member 4 for retaining this hooking member.

In the illustrated example, the pedal is the type with a double retention plane 5, 6 for the hooking element. The pedal is provided with two opposite elements each of which constitutes the front fixed member 3 on one of the two retention planes and the rear movable member 4 on the other retention plane.

Each element 7 is constituted by a resilient metal blade which extends over all the thickness of the pedal body 1 and which projects on opposite sides of the latter. The ends of each element 7 are shaped as hooks directed inwardly so as to constitute engagement and retention members properly so called on the two retention planes.

Each blade 7 receives within it the pedal body 1 and is gripped against the latter with the help of a plate 8 disposed outside the blade. The plate 8 is fixed to the pedal body 1 by means of a screw 9 extending through an opening 10 provided in the plate 8 and a hole 11 provided in the blade 7 to be screwed into a nut 12 embedded in the pedal body 1.

The screw head 13 is disposed in a groove 14 provided in the lower external portion of the plate 8.

The plate 8 defines a bending line across the width of the blade 7 so as to merit the latter to work bendingly between a position releasing the hooking element of the bicyclist's shoe and a position for retaining the latter. The length L of the corresponding lever arm is shown in FIG. 4.

So as to prevent irreversible deformation of the blade, the feature of the latter is limited thanks to a bending space defined by an internal recess 15 in the upper portion of the plate 8. This recess extends between the upper end of the plate and terminates downwardly in a shoulder 16 defining the line of bending of the blade.

Figure 4:
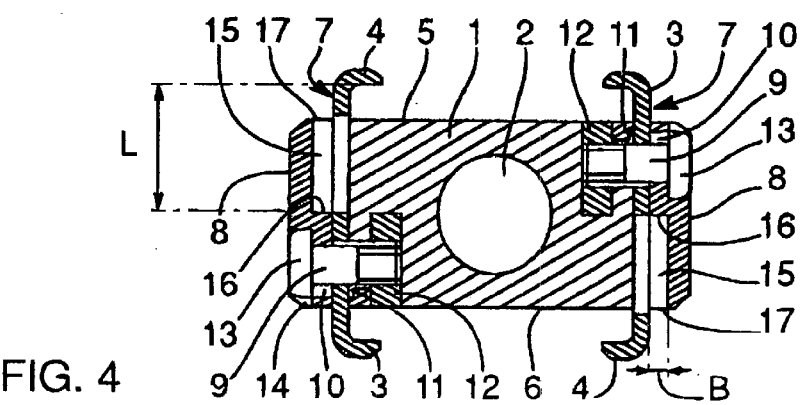
FIG. 4 is a cross-sectional view on the line A—A of FIG. 1.
Figure 5A:
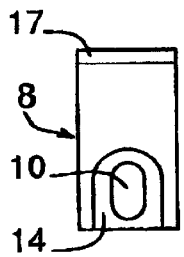
FIG. 5A is a view in the plane of a securement and adjustment plate according to the invention.
Figure 5B:
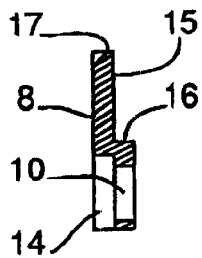
FIG. 5B is a longitudinal cross-section of the plate of FIG. 5A.

The upper edge 17 of the recess 15 constitutes an abutment which limits the bending of the blade 7 during the swing of the blade as indicated by the letter "B" in FIG. 4.

So as to adjust the hardness of the blade 7, the length L of its lever arm can be modified by heightwise displacement of the plate 8. This displacement is made possible because the opening 10 of the plate is oblong. The groove 14 is also oblong to permit the screw head 15 to move in it. If the length of the lever arm decreases by displacing the plate 8 upwardly, the blade becomes less flexible.

These adjustment means of the length of the lever arm are preferably associated with indexing means which can quite simply comprise a reference mark 18 engraved on the external surface of the plate 8 and plus and minus signs 19 between which the reference mark 18 can be moved with the plate to indicate an increase or decrease of the hardness of the blade.

The resilient blade 7 must have a rigidity relative to the level of its hooked ends, which is to say that its thickness must be at least 2 mm, whilst in its median portion, it must have a large flexibility to serve as a spring.

FIGS. 6 to 10 show five modifications of the resilient blade 7 adapted to give it the desired flexibility in its medial portion.

Figure 6A:
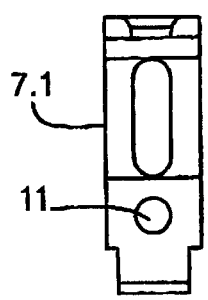
FIG. 6A is a view in the plane of a first embodiment of an element constituting a rear movable retention member according to the invention, as well as a fixed engagement member.
Figure 6B:
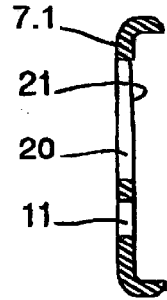
FIG. 6B is a longitudinal cross-section of the element of FIG. 5A.

FIGS. 6A and 6B show a blade 7.1 which in its medial portion comprises an elongated slot 20 such that the blade uniformly deforms, it is this portion flattened in a bevel 21.

Figure 7A:
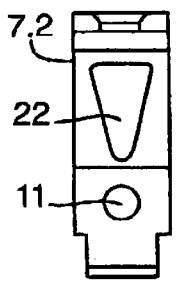
FIG. 7A is a view in the plane of a second embodiment of an element constituting a movable rear retention member according to the invention, as well as a fixed engagement member.
Figure 7B:
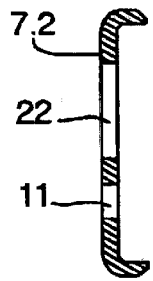
FIG. 7B is a longitudinal cross-section of the element of FIG. 7A.

FIGS. 7A and 7B show a blade 7.2 which in its median portion comprises a triangular opening 22 such that the deformation will be harmonious, the lower portion of the blade adjacent the hole 11 for passage of the screw 9 being more strongly urged than the upper portion.

Figure 8A:
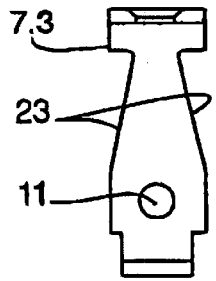
FIG. 8A is a view in the plane of a third embodiment of an element constituting a rear movable retention element according to the invention, as well as a fixed engagement member.
Figure 8B:
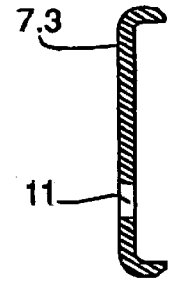
FIG. 8B is a longitudinal cross-section of the element of FIG. 8A.

FIGS. 8A and 8B show a blade 7.3 which in its median portion comprises two opposite and symmetric cutouts 23 which narrow the blade upwardly.

Figure 9A:
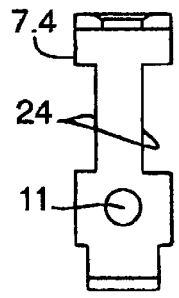
FIG. 9A is a view in the plane of a fourth embodiment of an element constituting a rear movable retention element according to the invention, as well as a fixed engagement member.
Figure 9B:
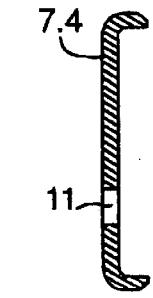
FIG. 9B is a longitudinal cross-section of the element of FIG. 9A.

FIGS. 9A and 9B show a blade 7.4 which in its median portion comprises two opposite and symmetrical cutouts extending parallel to each other.

Figure 10A:
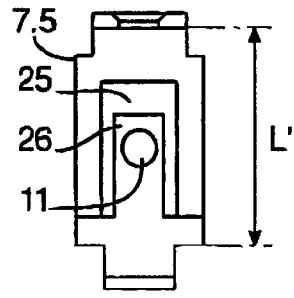
FIG. 10A is a view in the plane of a fifth embodiment of an element constituting a rear movable retention member according to the invention, as well as a fixed engagement member.
Figure 10B:
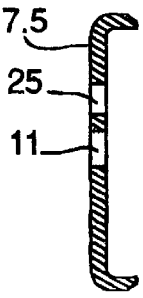
FIG. 10B is a longitudinal cross-section of the element of FIG. 10A.

Finally, FIGS. 10A and 10B show a blade 7.5 which in its median portion comprises a U-shaped cutout 25 which delimits a tongue 26 in which is provided the securement hole 11. This has the result that the length L' of the lever arm of the blade portion subjected to deformation is increased relative to the length L shown in FIG. 4.

The pedal according to the invention is particularly easy to assemble, the more so as the number of pieces is quite limited.

Other embodiments are possible without thereby departing from the scope of the invention. It is for example possible simply to apply the invention to a pedal with a single retaining surface.

What is claimed is:

1. A bicycle pedal comprising:
    a pedal body (1) provided with a front fixed member (3) for engagement with a hooking element fixed below the sole of a bicyclist's shoe, and with a rear movable member (4) for retaining said hooking element,
    wherein the rear movable member (4) comprises a resilient member (7) fixed in a containing relationship on the pedal body (1) and operating bendingly between a bent position to free the hooking element and a retaining position for the latter against a retaining plane (6, 7) on the body of the pedal (1);

wherein the resilient member (7) comprises a blade working by bending across a width of said blade;

wherein the blade (7) is gripped between the pedal body (1) with the help of a plate (8) disposed outside the blade (7) and which defines the bend line of the blade; and wherein the plate (8) is adjustable in height so as to move the line of bending of the blade to adjust the hardness of the blade (7) by modifying the length (11) of the lever arm of the latter.

2. The pedal according to claim 1, wherein the plate (8) is, so as to permit its heightwise adjustment, provided with an oblong opening (10) through which passes a securement screw (9) for the blade (7) on the pedal body (1), by gripping the blade between the pedal body (1) and the plate (8).

3. The pedal according to claim 1, characterized in that the plate (8) and the pedal body (1) comprise indexing means (18, 19) indicating an increase or decrease of the hardness of the blade (7).

4. A bicycle pedal comprising:

a pedal body (1) provided with a front fixed member (3) for engagement with a hooking element fixed below the sole of a bicyclist's shoe, and with a rear movable member (4) for retaining said hooking element, wherein the rear movable member (4) comprises a resilient member (7) fixed in a containing relationship on the pedal body (1) and operating bendingly between a bent position to free the hooking element and a retaining position for the latter against a retaining plane (6, 7) on the body of the pedal (1);

wherein the resilient member (7) comprises a blade working by bending across a width of said blade; and wherein the blade (7.1) comprises in its median portion an elongated slot (20) and a beveled portion so that the blade deforms uniformly.

\* \* \* \* \*